UNITED STATES PATENT OFFICE.

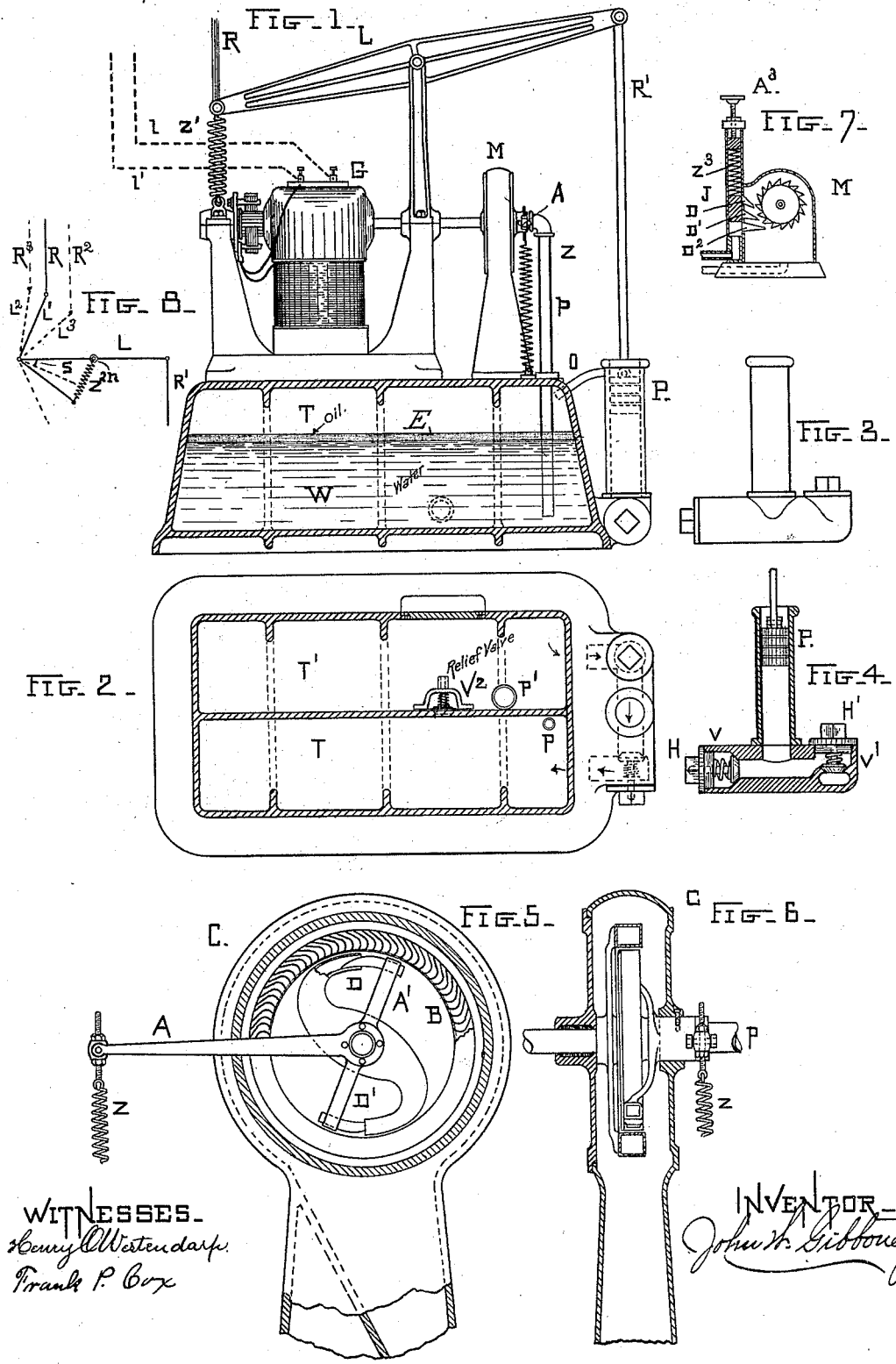
(No Model.)
J. W. GIBBONEY.
ELECTRIC LIGHTING BY WIND POWER.
No. 569,754. Patented Oct. 20, 1896.

JOHN W. GIBBONEY, OF LYNN, MASSACHUSETTS.

ELECTRIC LIGHTING BY WIND-POWER.

SPECIFICATION forming part of Letters Patent No. 569,754, dated October 20, 1896.

Application filed July 23, 1896. Serial No. 600,248. (No model.)

*To all whom it may concern:*

Be it known that I, JOHN W. GIBBONEY, a citizen of the United States, and a resident of Lynn, in the county of Essex and State of Massachusetts, have invented a certain new and useful Improvement in Electric Lighting by Wind-Power, of which the following is a specification.

My present invention relates particularly to the driving of a dynamo-machine or electric generator by a windmill, the current from which generator is to be usually stored in a storage battery and used as desired.

The use of a windmill as a prime mover to drive an electric generator in a storage-battery installation has been frequently attempted hitherto and with more or less degree of success. The difficulties which arise in such use of a windmill are mostly due to the unsteady character of the driving source, and various methods have been adopted and different apparatus organized to render such an installation practical, notwithstanding this inherent disadvantage attending the employment of a variable-power source. It has been proposed by some to increase and decrease the area of the sail-surface of the windmill itself in correspondence with the velocity of the wind, so as to obtain a more nearly constant speed at the dynamo. This, however, is an inefficient and objectionable plan, since when a strong wind arises the total obtainable energy is only partially utilized, owing to the great decrease of sail-surface, and there is required a much larger windmill than would otherwise be the case to obtain an equal amount of power. It has also been proposed to allow the dynamo speed to vary in correspondence with the wind velocities and vary the strength of the field-magnets, so as to generate the electric current at the proper potential to charge storage batteries. The objection to this arrangement is that it requires a large dynamo to be employed, thus increasing the idle load, and, besides, involves difficulties from sparking at the dynamo-commutator, especially in the case of dynamos of considerable size, as will be again reverted to herein. Further, the scheme of cutting in and out battery-cells or arranging them in multiple or series combination, so as to make the counter potential of the batteries high as the speed and voltage of the dynamo rises, has been tried. Apparatus involving the use of this plan is very objectionable on account of the unavoidable and frequent short-circuiting of the storage batteries during the cutting in and out of cells, besides which, also, there exists the complication of added apparatus to perform the switching operations using power for its working, and the fact that the battery-cells are charged unequally, necessitating frequent changing of the connections by hand or by automatic mechanism to equalize the charge, while it is impossible to avoid unequal working of the cells. Storage of the wind-power in fly-wheels has also been suggested and used, the power being derived secondarily from the fly-wheel for the propulsion of the dynamo. Devices operating according to this plan are objectionable because the absorption of power by a fly-wheel is relatively large, owing to added friction and windage losses at the same time that the amount of power able to be stored in a moderate size fly-wheel is relatively small; and, further, the inertia of the fly-wheel prevents the windmill from responding readily to changes of wind velocity, or, in other words, acts to prevent it from running at its most efficient speed under such varying conditions.

Again, speed-changing mechanisms have been interposed between the windmill and the dynamo with the object of obtaining a more nearly constant speed at the dynamo. Apparatus operating according to this plan is objectionable when it demands the use of shifting-belts, cones, or friction-transmitting devices or mechanisms, first, because they do not respond readily enough to variations of wind velocity, and of themselves absorb a large fraction of the total power available, particularly in the case of moderate size windmills, when they may absorb nearly all the power furnished by a light wind.

Still further, it has been proposed to operate air-compressing pumps by a windmill with compressed air, which, upon a certain predetermined pressure having been attained, is automatically delivered to an engine to drive it, and by it a dynamo the current from which charges batteries, or is otherwise utilized. Apparatus of this class involve the use of relatively large storage-tanks, besides which there is involved a large loss of power by the rapid expansion of the air in the pistons of the air-engine unless such air has been first artificially superheated, and this involves additional apparatus and more care-taking and expense, and the loss unavoidable in driving the engines themselves, which have numerous moving parts and many rubbing-surfaces. Another proposition in this connection has been to pump water to an elevation by a pump operated by the windmill, such water after having accumulated to a certain amount automatically discharging through a water-motor driving a dynamo. This plan is more economical under certain conditions, but it has the great objection that either a large water-motor must be used with the water delivered at a moderate head and with speed-changing mechanism employing belting or gearing to the dynamo, which latter is essentially a high-speed type of machine, or if a small water-motor be used, directly connected to the dynamo, involving the construction of a tank at a great height, so that to obtain a pressure of even fifty pounds to the square inch a tank at a height, roughly speaking, of one hundred feet is required, demanding in turn the erection of a very costly tower, excepting in those rare instances where a natural elevation or hill is available. More than this, however, such a plan is inefficient in that the water must be forced against a constant back pressure or head due to the total height of the water-column leading to the elevated tank, and either one of two plans must be adopted. First, the windmill may be geared to have sufficient leverage to pump water to such a height in a moderate wind, in which case it is not able by change in speed alone of operating efficiently at high wind velocities, or, on the other hand, if the ratio of gearing or connection to the pump is made to be efficient (as efficient as practicable) at high wind velocities, then it fails to operate at all at low wind velocities and there is no power at all obtained from such lower velocity winds.

My invention aims to overcome all of these various difficulties mentioned; and its objects are, first, to obtain the desired speed at the dynamo whatever may be the speed of the windmill; second, to avoid the use of frictional transmitting apparatus, such as gears, belting, pulleys, coned pulleys, friction-wheels, &c., with belt-shifting or wheel-shifting devices, together with all rapidly-running shafting, belts, or gears and other frictional-power wasteful arrangements; third, to reduce the number of bearings as far as possible and thereby the waste of power at such points and lessen the number of places that require oiling; fourth, to provide a power-storage whereby winds beyond the capacity of the dynamo and which last but a short time may be utilized; fifth, to render the apparatus unobjectionable as regards noise; sixth, to render the apparatus universally applicable to windmills of all sizes whether of the pumping or geared type, and, seventh, to obtain a combination of parts and a species of regulation which shall make all the machinery efficient throughout all the ordinary variations of wind velocity from the lowest to the highest, that is, to obtain a high efficiency of conversion of the power of the wind by means of the windmill as a wind-motor, by transformation through an intermediate motor operating by liquid-pressure and peculiarly governed as to its speed and torque, and, finally, at the dynamo itself, having in mind the fact that the windmill and intermediate motor, usually a water-motor or a liquid-pressure motor, require to have a certain speed of revolution with respect to the impinging stream of air or liquid impelling them in order to operate with the greatest efficiency, according to well-known, established, and recognized dynamic laws.

I consider this last object and its consummation as the most important in my present invention.

To this end my invention consists in the method of charging storage batteries and in the construction and organization of parts, hereinafter fully described, and set forth in the claims.

I will now describe the invention by reference to the accompanying drawings, which form a part of the present specification, and in which—

Figure 1 is a side view, partly in section, of my improved apparatus. Fig. 2 is a plan view of a part of the same. Figs. 3, 4, 5, and 6 are details, and Figs. 7 and 8 are modifications.

In Fig. 1 T T' is a tank or reservoir, which may, if desired and as shown, constitute the base of the apparatus. It forms in reality a divided tank or two tanks, as will be seen in the plan view of the same, Fig. 2, where T T' indicate the two compartments, which are entirely closed, but have certain communications, as will be explained.

G is an electric generator, and it is directly coupled to a water-motor M, as indicated.

P is a pump adapted to be operated by a rod R, leading to the windmill-crank at the top of the tower, the windmill itself not being shown. The compartment T of the tank or closed reservoir is designed to contain water or fluid under pressure and air under pressure, and a pipe $p$ leads therefrom to the water-motor M, the said pipe going nearly to bottom of tank T. The tank T' is intended to receive the waste water from the motor M by the pipe $p'$, and the air above the water in this tank is at or below atmospheric pressure.

The office of the pump P is to take water from the compartment T' and force it into the compartment T and against the air-pressure found therein. To avoid loss of power by the friction of the water in its passage in the ways between the compartments T T', such passages and the valves therefor are made as short as possible and of large size, and also the valves for the pump P (shown at V V', Fig. 4, which figure shows the pump in section) are made large and ample in size. The continuous entrance of water into the compartment T and its flow to the motor M under pressure would soon carry off the air above it by absorption. Such loss might be compensated for by allowing a small air leak in the pump P, as is commonly done; but the arrangement which I prefer is to put a body of oil E in the compartment T, which oil forms a rather thick layer between the water and the air and effectually separates the two, the level of the water, of course, never being allowed to get so low as to permit oil to enter the pipe $p$.

The water-motor M is so constructed and regulated that the volume of water which passes through it is governed by the pressure of air in the tank T, and in such manner that practically no water at all passes when the pressure is below a predetermined minimum, while for working pressures the volume of water is automatically regulated to give that speed to the dynamo G which will cause it to deliver a current of the proper potential and volume for the storage battery and which is best adapted to utilize the power of the windmill. This requires a particular kind of regulation.

The storage battery has usually a very low resistance, so that an electromotive force at the dynamo very slightly in excess of the counter-potential of the battery suffices to pass a large current. Now a plain shunt-wound dynamo, if geared to a windmill so as to furnish a charging-current at a moderate working speed, delivers at once, or tends to deliver at once, too high a potential at a higher speed, with the result that the current increases in value very rapidly, which so loads the windmill as to prevent its running at an efficient speed with an increased wind velocity. In other words, the counter-torque of the dynamo increases too rapidly, for it is a fact that the windmill must be allowed to increase its speed at a very much greater rate than would be possible in the assumed case in order to approach efficient working conditions as a wind-motor.

It has been proposed to reversely compound the dynamo-fields, or to reduce the current in the shunt-fields, or, in other words, reduce the strength of the field-magnets of the dynamo, to the end that the speed of the windmill and dynamo might both increase and the latter still deliver a more nearly constant potential; but this plan has grave objections, for in this case, and particularly when large dynamo-current values are reached, the armature as a magnet overcomes the field-magnets as magnets, that is, the armature magneto-motive force overcomes that of the field, with the result that the field is distorted, so as to change the neutral point of the brushes or the proper point of commutation, and this produces sparking and of course impairs any regulation which has been set. In the case of a moderate size dynamo, where the current is small, so that the commutation can be forced, and by the use of large carbon-brushes, such change of the neutral point may not be so damaging; but the matter is very different when currents of considerable value have to be dealt with, and in either case it is a thing to be avoided.

The proper method of operation is to maintain a strong magnetization of the field-magnets and to drive the armature at that increased speed and with that increased torque which will give at the slightly-increased speed the proper potential for charging the batteries and with a current which will only sufficiently load the windmill as to permit it to run at an efficient speed with any given working wind velocity. If this is accomplished by a given apparatus, it is only required to add an economical power-storage arrangement to save the energy of wind-gusts, when the utility and economy of the apparatus will have been assured. This I accomplish.

Referring to Figs. 5 and 6, it will be seen that the water from the pipe $p$ passes through two hollow arms D D' and emerges at two outlets in opposite directions and impinges against the buckets or wings of the water-motor M, which motor is of course of the impulse type and naturally of high speed. These outlets in the arms D D' are provided with sliding stoppers adapted to entirely close or vary the size of the openings in the arms D D', and are controlled in their position by levers A A', as influenced by a regulable spring Z or by a weight as its equivalent.

The operation is as follows: Assuming that water under a pressure of fifty pounds to the square inch will operate the motor M and dynamo G at a speed to furnish a minimum charging-current to the storage batteries, that the area of the outlets or nozzles of D D' is one-half inch each, that the spring or weight Z exerts a pressure of fifty pounds at the ends of the arms A A', and that there is no water in the compartment T under pressure, the outlets for D D' will be entirely closed. If now the pump P begins to operate, water from the compartment T' will be forced into T against the air-pressure therein, which is low at first, but gradually increases until a pressure of fifty pounds is reached, at which time the spring Z will be overcome and the outlets for D D' opened very slightly. A small jet of water having a velocity due to fifty pounds pressure will then drive the motor M and generator G at such a speed as to deliver a small current, but of the proper charging potential. If the pump P increases in speed, the pressure in the compartment T rises, but the spring Z or weight (which has of course been previously properly adjusted) is still further overcome, the stoppers for D D' recede, the velocity of the jet increases slightly, but the volume of water more rapidly, and with this condition the dynamo G, which is assumed to be a plain shunt-wound machine, is driven at the slightly-increased speed with a much greater torque, corresponding to the increased pressure and volume of water flowing to the motor M, but, it will be noted, depending more upon the volume than upon the pressure for this increased torque, and the adjustment of the parts is made such that with the maximum pressure in the compartment T the outlets for D D' are fully opened and the volume of water and, likewise, the volume of current are increased to the full amount or up to the capacity of the apparatus. Between the minimum and maximum conditions of load, of course, the adjustment is such as to retain the proper current flow and allow the windmill to run under efficient speeds. Further, the tank T is a static reservoir for power. There will exist sudden gusts of wind capable of furnishing power beyond the capacity of the motor M and dynamo G to immediately absorb it, but with the apparatus shown the pump P will at such time act to increase the amount of water in the tank T, which is afterward supplied for a longer period to the motor M, and it is of course evident that the capacity of the tank T determines the amount of storage which is possible.

It is obvious that the main regulation needed in this arrangement of apparatus is to properly adjust the power of the spring Z or weight, so that its varying resistance to the pressure of the water at the outlets D D' shall be suited to the characteristic potential curve of the dynamo G, and also to the resistance of the storage batteries, and this would be most readily determined in any given instance by actual test with instruments for taking potentials and measuring resistances. It will be seen that the organization of apparatus described admits, as it were, of changing volume of water flowing from T to T' for volume of current generated by the dynamo G, and it is to be remembered that in charging batteries it is to an increased current mainly that one must look to absorb the increased wind-power, while still retaining proper and efficient speeds for the windmill itself with given wind velocities.

My invention enables the windmill to run at those velocities which practice has determined makes it an efficient impulse-motor, and I obtain storage of power in the tank T without such losses as are attendant upon the use of fly-wheels having windage and friction losses, while I am enabled to use a plain shunt-machine for charging storage batteries, which it is well known is most suitable for this kind of work, not being subject to reversal of its polarities by current from the batteries and, owing to the mode of regulation described, maintains a strong commutating field at the generator G.

It may now be noted that the water-motor and generator G are connected to the same shaft with few bearings, and that there exists no side pressures upon this shaft, such as would be found when belting or gearing are used, and that therefore friction losses are avoided by this arrangement. It will also be seen that the only parts of the machinery requiring oiling are practically the motor and generator-shaft, the windmill-bearings, and the pump-shaft, and, as stated, the only high-speed bearing is found in the motor-generator combination, where little pressure exists.

In the drawings I have indicated the pump P as driven from the rod R through the intermediation of a walking-beam L. This is simply provided in order that the heaviest part of the stroke upon the rod R shall be accomplished when it is ascending, that is, by a pulling action, while avoiding the use of a packing-box at the top of the pump P; but of course if such a packing-box were provided the lever could be dispensed with and likewise the additional bearings entailed by its use. The spring Z', attached to the walking-beam L, actuates the pump P during its upward stroke and incidentally takes up lost motion in the rod R and avoids noise. The small pipe O, shown lying over the top of the pump P and leading to the compartment T', is to conduct away any water that might leak by the pump-piston. The valve $V^2$, between the compartments T T', Fig. 2, is spring-closed and is to relieve any excessive pressure in T beyond the power of the motor and dynamo to utilize.

It will be noted that the pump P only operates during the passage of winds having a sufficient velocity to actuate the apparatus, and in addition to the advantages heretofore mentioned I save the wear and tear of the windmill and connected apparatus present in other arrangements with low wind velocities, and such apparatus may run for long periods at too low velocities to do any effective work, while the wear and tear remain.

In Fig. 7 is shown an arrangement which may be used instead of that described, but which I do not consider in any way so desirable. It consists of an impulse-motor having multiple nozzles D D' $D^2$, which are adapted to be successively opened by the increasing pressure of the water from a tank, such as T, and to be closed again, of course, when the pressure decreases, a spring $Z^3$ acting on a plunger J and a regulating-screw $A^3$ determining its effect. Such an arrangement will merely approach the conditions of operation desired in my present invention without entirely realizing them, as it is evident that the capacity for regulation is much reduced. I may also mention here that it is of course well recognized among engineers that partially shutting off a supply of water in a pipe back of a water-nozzle, as by a valve, in impulse-motor installations is very wasteful of power and is not at all equivalent to varying the size of the issuing jets themselves.

In Fig. 8 is indicated an arrangement which has for its object the utilization of light winds in operating the pump P up to the condition of full pressure in the tank T. It consists of a primary lever L, pivoted at the point $n$, having a rod R' going to the pump, and a secondary lever, here shown as an angled lever L', connected at one end to the windmill-rod R, and at its other to a spring $Z^2$, the other end of which spring is attached to the fixed point $n$, and which lever is pivoted to the end of the lever L. S is a stop determining the position of the lever L' in the retracted position of the spring $Z^2$. The spring $Z^2$ is selected to be of such power as will allow the pump to work up to the full pressure set, say fifty pounds to the square inch, without there occurring any movement of L', and this might be, say, a wind of eight miles an hour, but should the wind velocity increase the pump tends to operate faster, the back pressure increases, and the spring $Z^2$ is overcome, and the lever L' and rod R will move to the positions $L^3 R^2$, respectively, at which point the spring $Z^2$ overcomes the back pressure of the pump, and the latter works; but it will be seen that the relations of leverage between rods R and R' have been changed, the rod R acting virtually nearer the fulcrum $n$, so that R' is given an amplified traverse, and the adjustment of the levers and spring $Z^2$ is such that with the higher wind velocities the ratio of leverage changes to cause the pump to make a greater stroke, and with the lowest wind velocity selected as a working wind the pump has a minimum traverse. In this way the power of the wind is more efficiently used than by mere increase of the strokes of the pump alone, as by the described arrangement both the number of strokes and the length of the strokes are varied to suit any given wind velocity. Of course the pump-piston with this device is made long enough to permit the maximum traverse, and with low wind velocities the piston moves back and forth near the middle of the pump-cylinder. During the retraction of the spring $Z^2$ it tends to drive the windmill until the stop S is reached, that is, there is a certain amount of lost motion during the traverse, of which the spring $Z^2$ simply absorbs or gives back power and the lever L is stationary.

It is obvious that an alternate arrangement of the parts typified in Fig. 8 would be to place the lever L' at the opposite end of lever L or on the pump side and in such a way of course as to give the same relative change of leverage between the point of application of power to the lever L on one side and the points where it is taken off, as before; that is, between the point where the rod R acts on L and the point where L acts upon R'. It will also be noted that in Fig. 8, for convenience of illustration, it is assumed that the windmill pumping-rod R is supposed to do its heaviest work in actuating the pump on a downward stroke or with a pushing stroke.

What I claim as my invention is—

1. The method of charging storage batteries from a variable source of power, consisting in maintaining a strong magnetization of the field of the generator, storing the energy of the variable source of power until sufficient to start the generator at the required charging potential, and regulating the application of said power to produce a volume of charging-current proportionate to the amount of energy delivered at the place of storage, substantially as set forth.

2. In an apparatus for charging storage batteries, the combination with an electrical generator, of a fluid-motor for operating it, a closed chamber of a fixed capacity in which the motor-driving fluid is stored, a variable source of power operating to increase the pressure upon said fluid, and a regulator controlling the admission of the fluid to the motor, substantially as set forth.

3. The combination with a source of variable power, of a closed tank of fixed capacity, a fluid-motor connected thereto, a pump operated by said power for forcing fluid into said tank, and an automatic means for admitting the fluid to said motor when the pressure in said tank reaches a predetermined degree, as and for the purpose set forth.

4. The combination with a closed storage-tank and a receiving-tank, of a pump for transferring fluid from the latter to the former, and a fluid-motor connected to the storage-tank and discharging into the receiving-tank, as and for the purpose set forth.

5. The combination with the generator, of the hollow base divided into a storage-tank and a receiving-tank, a fluid-motor connected to said generator and communicating with both tanks, and a pump for transferring fluid from the receiving-tank to the storage-tank, as and for the purpose set forth.

6. In an impulse fluid-motor, the combination with the fluid-discharge outlets, of a device actuated and controlled by the pressure of the operating fluid for regulating the discharge from said outlets, substantially as set forth.

7. The combination with the impulse fluid-motor, of the taper-plugs controlling the outlets D, D', and an automatic pressure-controlled device for controlling the movement of said plugs and thereby regulating the discharge from said outlets for the purpose specified.

8. The combination of a windmill, a pump operated thereby, a primary lever, and a secondary lever pivoted to said primary lever and having a controlling spring or weight, said levers forming a part of the connection between the windmill and the pump and being adapted in their operation to change the effective leverage relation between the windmill and pump in accordance with changes in the power applied by the windmill.

9. The combination with the windmill pumping-rod R, and the pump with its rod R', of the walking-beam, the angle-lever pivoted to one end thereof, the windmill pumping-rod connected to one end of the angle-lever, and a spring joining the other end thereof to a fixed point, substantially as and for the purpose set forth.

10. The combination of a dynamo-generator for charging a storage battery, a motor, a variable source of power such as a windmill, means for storing the energy thereof until sufficient to move the generator at the required charging potential, and an automatic regulator for connecting the motor with the stored energy when the required pressure is obtained.

11. The combination of a dynamo-generator for charging a storage battery, a motor, a variable source of power such as a windmill, a fluid-pressure tank for storing the energy from said source of power until sufficient to move the generator at the required charging potential, and an automatic regulator for connecting the motor with the stored energy when the required pressure is obtained.

12. The method of charging storage batteries from a variable source of power, consisting in storing the energy from a variable source of power until sufficient to start the charging-generator at the required potential, and by the variations of the pressure or tension of the stored energy regulating the application of said power to produce a volume of charging current proportionate to the amount of energy delivered at the place of storage substantially as set forth.

Signed at Lynn, in the county of Essex and State of Massachusetts, this 20th day of July, A. D. 1896.

JOHN W. GIBBONEY.

Witnesses:
HENRY M. HOBART,
W. MUNVALLA.